United States Patent
Kim (10) Patent No.: US 9,858,856 B2
(45) Date of Patent: Jan. 2, 2018

(54) ORGANIC LIGHT EMITTING DISPLAY DEVICE AND DRIVING METHOD THEREOF

(71) Applicant: SAMSUNG DISPLAY CO., LTD., Yongin, Gyeonggi-Do (KR)

(72) Inventor: Jin-Woo Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 145 days.

(21) Appl. No.: 14/572,679

(22) Filed: Dec. 16, 2014

(65) Prior Publication Data
US 2015/0249816 A1    Sep. 3, 2015

(30) Foreign Application Priority Data
Mar. 3, 2014    (KR) ........................ 10-2014-0024939

(51) Int. Cl.
*G09G 5/10*    (2006.01)
*G09G 3/3208*    (2016.01)
*G09G 3/00*    (2006.01)
*G09G 3/20*    (2006.01)
*H04N 13/04*    (2006.01)

(52) U.S. Cl.
CPC ........... *G09G 3/3208* (2013.01); *G09G 3/003* (2013.01); *G09G 3/2029* (2013.01); *H04N 13/0438* (2013.01); *G09G 2330/021* (2013.01); *G09G 2330/023* (2013.01)

(58) Field of Classification Search
CPC .... G09G 3/3208; G09G 3/2029; G09G 3/003; G09G 2330/023; G09G 2330/021; H04N 13/0438

USPC .......................................................... 345/691
See application file for complete search history.

(56) References Cited

U.S. PATENT DOCUMENTS

| | | | |
|---|---|---|---|
| 2006/0227072 A1* | 10/2006 | Sato ..................... | G09G 3/2022 345/60 |
| 2008/0036712 A1* | 2/2008 | Chung ................. | G09G 3/3266 345/82 |
| 2011/0227956 A1* | 9/2011 | Park ..................... | G09G 3/3233 345/690 |
| 2012/0113168 A1* | 5/2012 | Seo ....................... | G09G 3/003 345/691 |
| 2012/0147000 A1* | 6/2012 | Song .................. | H04N 13/0497 345/419 |
| 2013/0113849 A1 | 5/2013 | Park | |

FOREIGN PATENT DOCUMENTS

| KR | 10-2012-0048282 A | 5/2012 |
|---|---|---|
| KR | 10-2012-0065717 A | 6/2012 |

* cited by examiner

*Primary Examiner* — Adam R Giesy
*Assistant Examiner* — Chineyere Wills-Burns
(74) *Attorney, Agent, or Firm* — Lewis Roca Rothgerber Christie LLP (57) ABSTRACT

A method of driving an organic light emitting display, the method including supplying a data signal of an i-th (i is a natural number) frame corresponding to a scan signal non-sequentially supplied during a first period in an i-th frame period, and supplying a data signal of (i+1)-th frame corresponding to a scan signal non-sequentially supplied during a second period, which is different from the first period, in the i-th frame period.

7 Claims, 6 Drawing Sheets

ORGANIC LIGHT EMITTING DISPLAY DEVICE AND DRIVING METHOD THEREOF

CROSS-REFERENCE TO RELATED APPLICATION

This application claims priority to and the benefit of Korean Patent Application No. 10-2014-0024939, filed on Mar. 3, 2014, in the Korean Intellectual Property Office, the entire content of which is incorporated herein by reference in its entirety.

BACKGROUND

1. Field

An aspect of the present invention relates to an organic light emitting display and a driving method thereof.

2. Description of the Related Art

With the development of information technologies, the importance of a display device, which is a connection medium between a user and information, has been increasing. Accordingly, flat panel displays (FPDs) such as a liquid crystal display (LCD), an organic light emitting diode (OLED) display device and a plasma display panel (PDP) are increasingly used.

Among these FPDs, the OLED display device displays images using organic light emitting diodes that emit light through recombination of electrons and holes. The OLED display device has a fast response speed and has a low power consumption.

SUMMARY

Aspects of embodiments according to the present invention are directed toward an organic light emitting display and a driving method thereof, which can reduce (e.g., minimize) power consumption.

According to an aspect of one embodiment of the present invention, there is provided a method of driving an organic light emitting display, the method including: supplying a data signal of an i-th (i is a natural number) frame corresponding to a scan signal non-sequentially supplied during a first period in an i-th frame period; and supplying a data signal of (i+1)-th frame corresponding to a scan signal non-sequentially supplied during a second period, which is different from the first period, in the i-th frame period.

The data signals having weights corresponding to different emission times may be supplied corresponding to consecutively supplied scan signals.

The i-th and (i+1)-th frames may be partially overlapped in time, and the second period is a period after a primary data signal corresponding to the (i+1)-th frame is supplied.

The primary data signal corresponding to the (i+1)-th frame may be supplied in synchronization with a scan signal supplied to a first scan line.

A black data signal may be supplied during the first period in the i-th frame period, and a left or right data signal of a 3D image may be supplied during the second period in the i-th frame period.

Left or right data signal for a 3D image may be supplied during the first period in the i-th frame period, and a black data signal may be supplied during the second period in the i-th frame period.

According to an embodiment of the present invention, there is provided an organic light emitting display wherein one frame includes a plurality of subfields, and has a unit time including j (j is a natural number of 2 or more) selection times, each of the selection times indicating when a scan signal is supplied, the organic light emitting display including: pixels positioned at areas defined by scan lines and data lines; a scan driver configured to non-sequentially supply a scan signal to the scan lines during the unit time; and a data driver configured to supply data signals having weights corresponding to different emission times during the unit time, wherein the data driver is configured to supply a data signal of an i-th (i is a natural number) frame during a first period in an i-th frame period, and to supply a data signal of an (i+1)-th frame during a second period except the first period in the i-th frame period.

The second period may be a period after a primary data signal corresponding to the (i+1)-th frame is supplied.

The data driver may be configured to supply the primary data signal corresponding to the (i+1)-th frame in synchronization with a scan signal supplied to a first scan line.

The data driver may be configured to supply a black data signal during the first period, and to supply a left or right data signal of a 3D image during the second period.

The data driver may be configured to supply a left or right data signal for a 3D image during the first period, and to supply a black data signal during the second period.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, certain example embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the present invention are omitted for clarity. Also, like reference numerals refer to like elements throughout.

Figure 1:
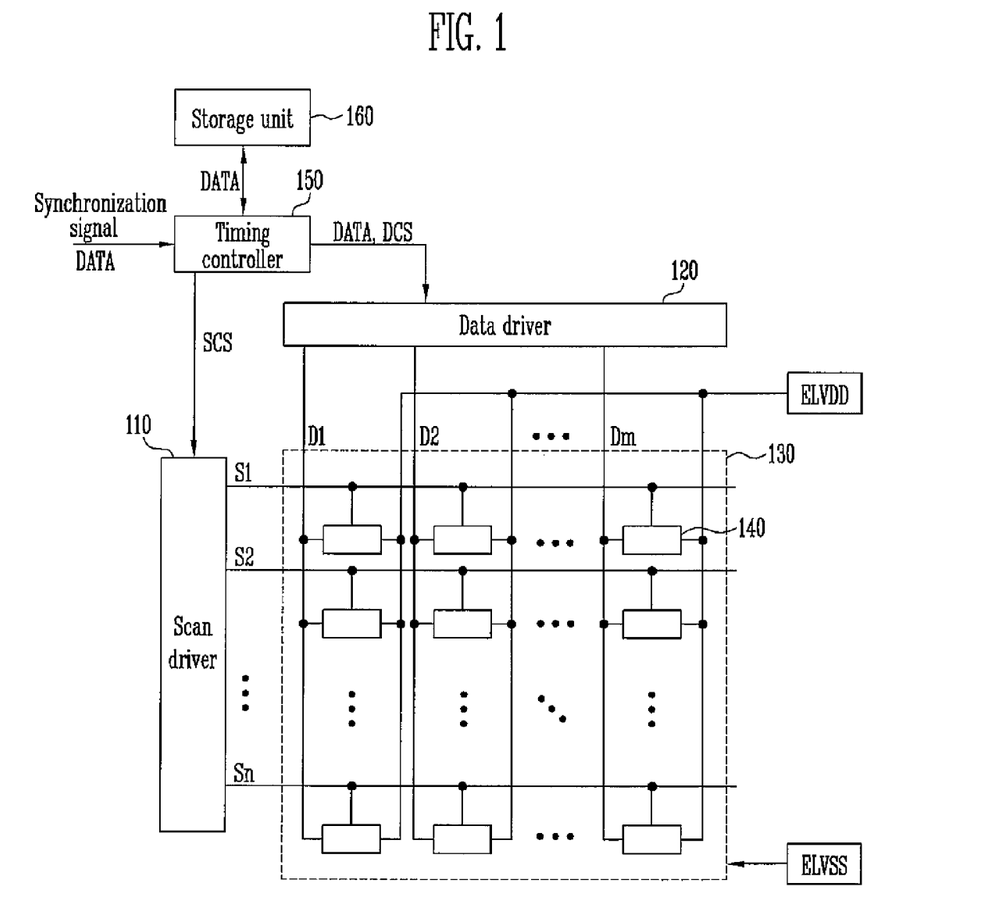
FIG. 1 is a diagram illustrating an organic light emitting display, according to an example embodiment of the present invention.

FIG. 1 is a diagram illustrating an organic light emitting display, according to an example embodiment of the present invention.

Referring to FIG. 1, the organic light emitting display, according to one embodiment, includes a display unit 130 including pixels 140 positioned at areas defined by scan lines S1 to Sn and data lines D1 to Dm, a scan driver 110 configured to drive the scan lines S1 to Sn, a data driver 120 configured to drive the data lines D1 to Dm, a storage unit 160 configured to store the data DATA, and a timing controller 150 configured to control the scan driver 110, the data driver 120 and the storage unit 160.

The timing controller 150 generates a scan driving control signal SCS and a data driving control signal DCS, corresponding to synchronization signals supplied from outside of the timing controller 150. The scan driving control signal SCS generated in the timing controller 150 is supplied to the scan driver 110, and the data driving control signal DCS generated in the timing controller 150 is supplied to the data driver 120. The timing controller 150 stores the data DATA supplied from the outside in the storage unit 160. In an example, the data DATA stored in the storage unit 160 may include left data and/or right data, corresponding to a three-dimensional (3D) image. The timing controller 150 supplies the data DATA stored in the storage unit 160, corresponding to a driving method. Additionally, although it has been illustrated in FIG. 1 that the storage unit 160 is positioned at the outside of the timing controller 150, embodiments of the present invention are not limited thereto. For example, the storage unit 160 may be installed inside the timing controller 150.

The scan driver 110 supplies a scan signal to the scan lines S1 to Sn, corresponding to the scan driving control signal SCS. In an embodiment, the scan driver 110 non-sequentially supplies a scan signal to the scan lines S1 to Sn, corresponding to the driving method. The driving method of the present embodiment, in which the scan signal is non-sequentially supplied to the scan lines S1 to Sn, will be described later. When the scan signal is supplied to any one scan line among the scan lines S1 to Sn, pixels 140 positioned on a corresponding horizontal line are selected.

The data driver 120 supplies a data signal to the data lines D1 to Dm, corresponding to the data driving control signal DCS. The data driver 120 supplies a data signal corresponding to the emission or non-emission of the pixel 140. For example, when a corresponding pixel emits light, corresponding to the scan signal, the data driver 120 supplies a first data signal. When the corresponding pixel does not emit light, the data driver 120 supplies a second data signal (black data signal). The data signal supplied from the data driver 120 may be divided into left and right data signals, corresponding to a 3D driving method.

The data driver 120 supplies a black data signal, corresponding to one of two consecutive frames for the purpose of 3D driving. The black data signal may be separately generated in the data driver 120, or be additionally supplied from the timing controller 150. Additionally, the data driver 120 supplies a data signal corresponding to an i-th (i is a natural number) frame during a first period in an i-th frame period, and supplies a data signal corresponding to an (i+1)-th frame during a second period, which is different from the first period, in the i-th frame period. This will be described in detail later.

The display unit 130 receives first and second power sources ELVDD and ELVSS supplied from an outside thereof, and supplies the received first and second power sources ELVDD and ELVSS to each pixel 140. Each pixel 140 implements a gray scale level (e.g., a predetermined gray scale level) while supplying current to an organic light emitting diode (in the event of emission) or supplying no current to the organic light emitting diode (in the event of non-emission), according to the data signal. That is, the organic light emitting display is driven by a digital driving method, and implements a gray scale level (e.g., a predetermined gray scale level) while controlling the emission time of each pixel 140. In some example embodiments, the pixel 140 may be implemented with various suitable types of circuits currently known in the art.

Figure 2:
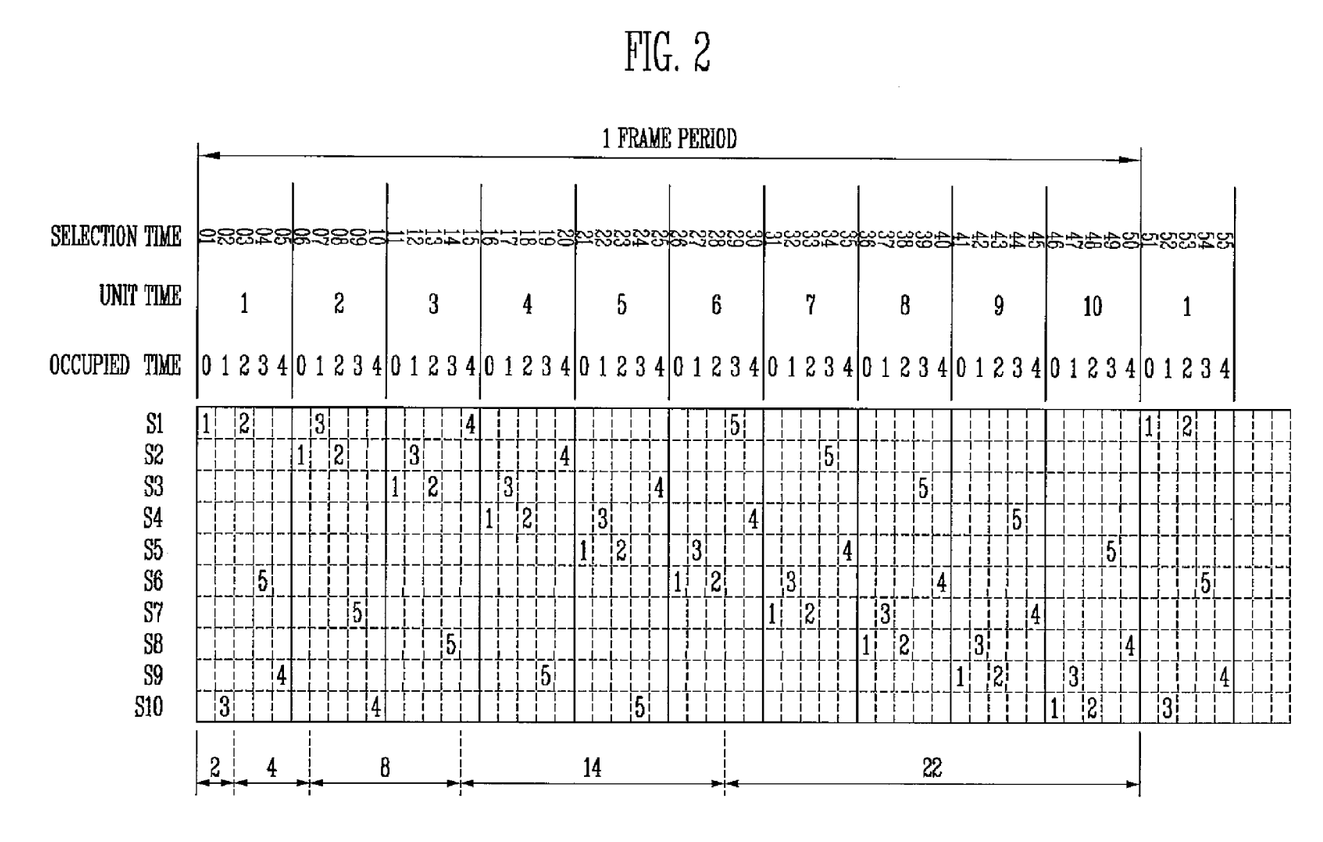
FIG. 2 is a diagram illustrating a digital driving method, according to an example embodiment of the present invention.

FIG. 2 is a diagram illustrating a digital driving method, according to an example embodiment of the present invention. For convenience of illustration, it is assumed in FIG. 2 that ten scan lines S1 to S10 are formed in the display unit 130.

In FIG. 2, "selection time" refers to a selection time as a minimum unit of time. During the selection time, a scan signal is supplied to a scan line. "Unit time" refers to a time divided using one frame as a control unit. During the unit time, digital data signals having different weights are supplied in synchronization with the scan signal. "Occupied time" is equally included in each unit time, and refers to a time when a data signal is supplied to a data line.

During one frame, scan signals corresponding to the number of subfields are supplied to each of the scan lines S1 to S10. For example, when one frame includes five subfields, five scan signals are supplied to each of the scan lines S1 to S10. The interval between the scan signals supplied to each of the scan lines S1 to S10 is determined according to the subfields.

For example, the data signal may be set to have weights of "2", "4", "8", "14" and "22", corresponding to a gray scale level to be displayed. In this example, one frame includes five subframes. When a data signal corresponding to the weight of "2" is supplied, a corresponding pixel emits light during two selection times. When a data signal corresponding to the weight of "14" is supplied, a corresponding pixel emits light during fourteen selection times. Thus, in some embodiments of the present invention, an image (e.g., a predetermined image) is displayed while non-sequentially supplying a scan signal, and supplying data signals having different emission times (different weights) during the unit time, corresponding to the non-sequentially supplied scan signal.

According to an embodiment, in the digital driving method, the scan signal is supplied to different scan lines during each selection time. For example, the scan signal is sequentially supplied to a first scan line S1, a tenth scan line S10, the first scan line S1, a sixth scan line S6 and a ninth scan line S9 during a first unit time.

In addition, a digital data signal corresponding to a weight (e.g., a predetermined weight) is supplied in synchronization with each scan signal. For example, digital data signals having a weight of "1" (corresponding to a first subfield) and a weight of "2" (corresponding to a second subfield) may be sequentially supplied in synchronization with the scan signal supplied to the first scan line S1 during the first unit time. Thus, the data driver 120 supplies data signals having different weights, corresponding to the consecutively supplied scan signals. In addition, the scan line receiving the data signal is selectively changed (e.g., increased by "1", and moves to S1 when the scan line is no less than S10)

corresponding to an increase in unit time (1, 2, 3, . . . ), thereby implementing an image (e.g., a predetermined image).

While the supply method of data signals shown in FIG. 2 corresponds to a specific pattern, embodiments of the present invention are not limited thereto. In some embodiments of the present invention, various suitable driving methods maybe applied in which scan signals are non-sequentially selected during a unit time, and data signals having different weights are supplied to the selected scan lines.

Figure 3:
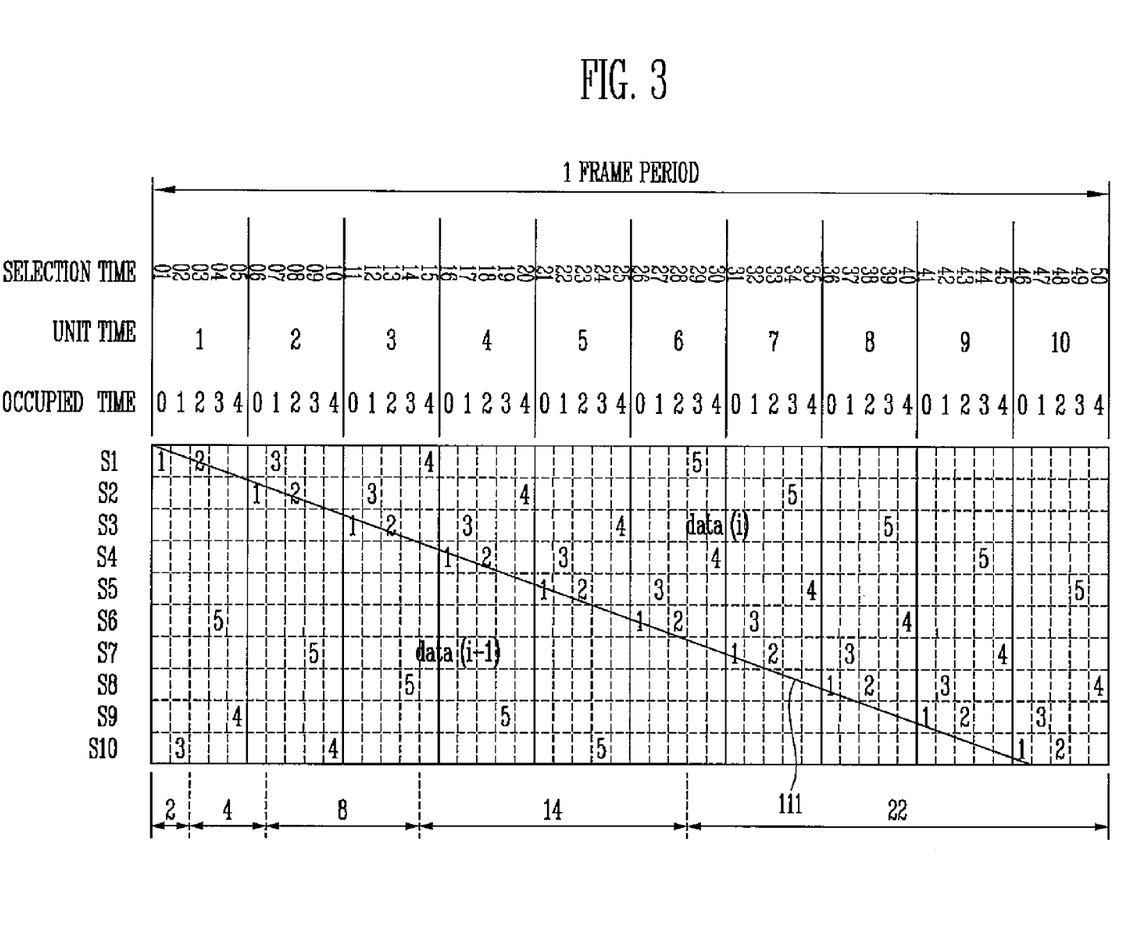
FIG. 3 is a diagram illustrating an example of a data signal displayed by the driving method of FIG. 2, according to an example embodiment of the present invention.

According to embodiments of the present invention, when the pixels receiving the primary scan signal supplied during each unit time are coupled (e.g., connected), this may be represented as a diagonal line 111 shown in FIG. 3. In an embodiment, when a general image (e.g., a 2D image) is implemented, a data signal data (i) of an i-th frame is supplied to the upper side based on the diagonal line 111, and a data signal data (i−1) of an (i−1)-th frame is supplied to the lower side based on the diagonal line 111.

Figure 4:
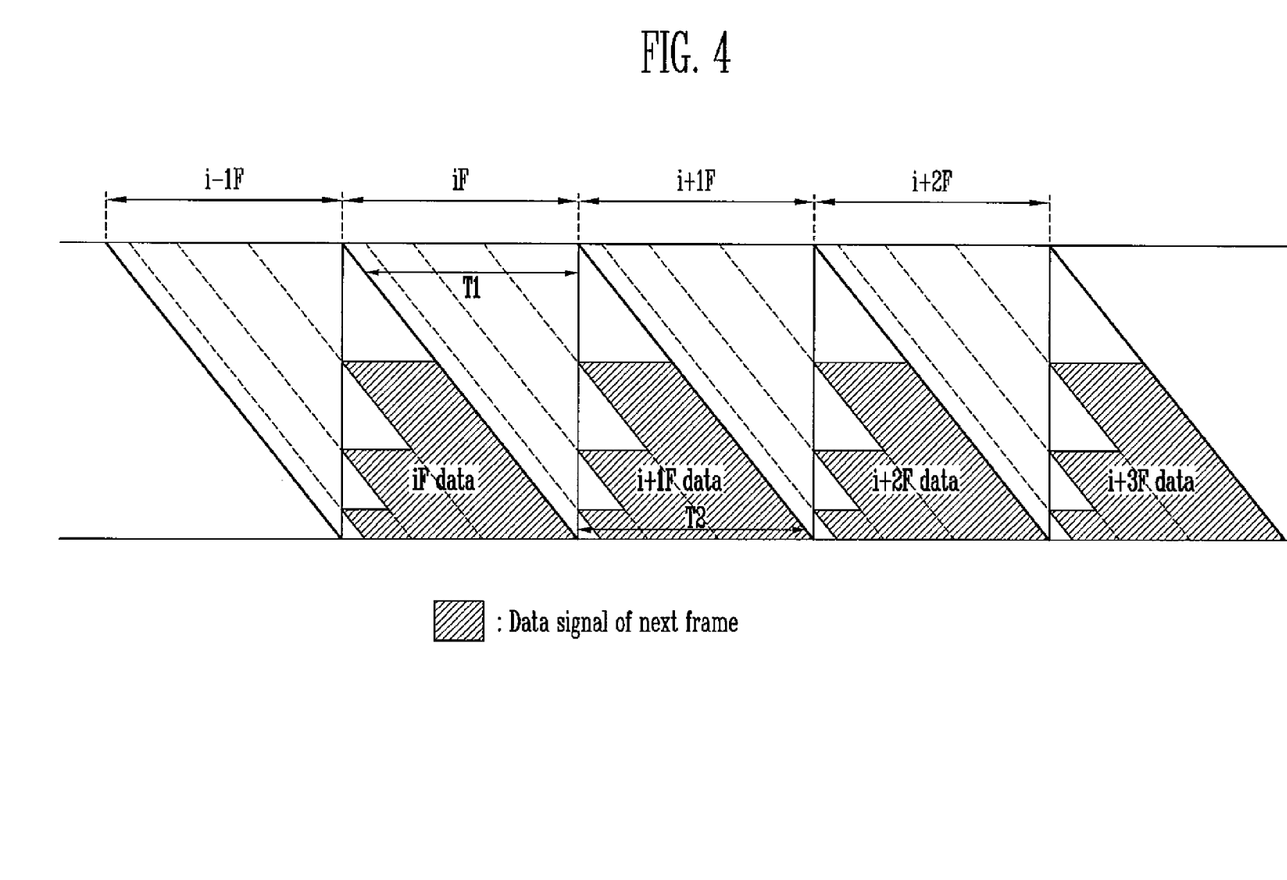
FIG. 4 is a diagram illustrating a 3D driving method, according to an example embodiment of the present invention.

FIG. 4 is a diagram illustrating a 3D driving method, according to an example embodiment of the present invention. The dotted lines shown in FIG. 4 schematically represent a plurality of subfields included in a frame period.

Referring to FIG. 4, in one embodiment, a 3D image is implemented using four consecutive frames i−1F to i+2F. In this embodiment, a data signal of an i-th frame iF is supplied corresponding to the non-sequentially supplied scan signal during a first period T1 in the i-th frame iF, and a data signal of an (i+1)-th frame i+1 F is supplied to the non-sequentially supplied scan signal during a second period T2, which is different from the first period T1. Thus, the pixels are driven by the data signal of the i-th frame iF and the data signal of the (i+1)-th frame i+1F during the i-th frame iF. Similarly, the data signal of the (i+1)-th frame i+1F is supplied during the first period T1 of the (i+1)-th frame i+1F, and a data signal of an (i+2)-th frame i+2F is supplied during the second period T2, which is different from the first period T1.

Figure 5:
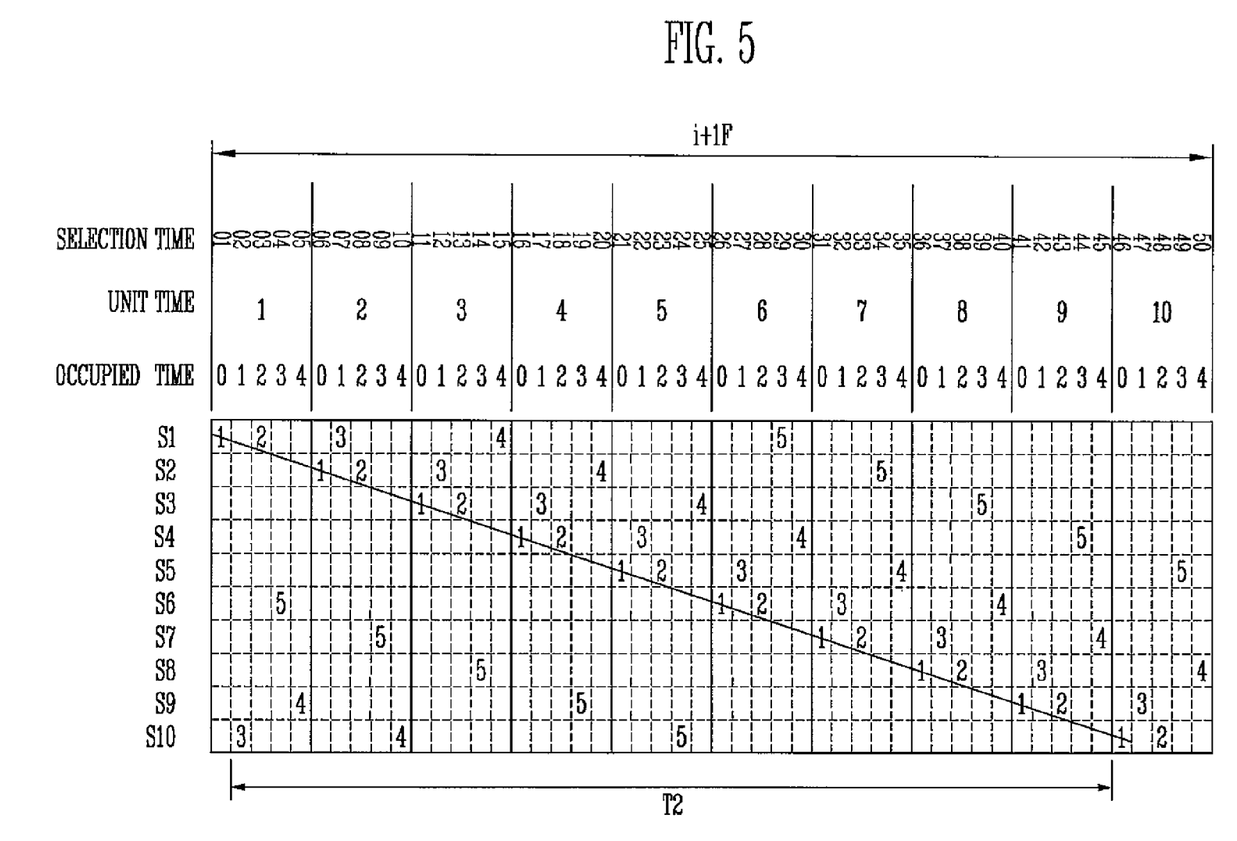
FIG. 5 is a diagram illustrating an example of a second period shown in FIG. 4, according to an example embodiment of the present invention.

The second period T2 in the i-th frame iF refers to a period after the primary data signal corresponding to the (i+1)-th frame is supplied. In other words, the i-th frame iF and the (i+1)-th frame i+1F are overlapped during a partial time, and the second period T2 refers to a period after the primary data signal of the (i+1)-th frame i+1F is supplied corresponding to the scan signal supplied to the first scan line S1 as shown in FIG. 5.

Figure 6:
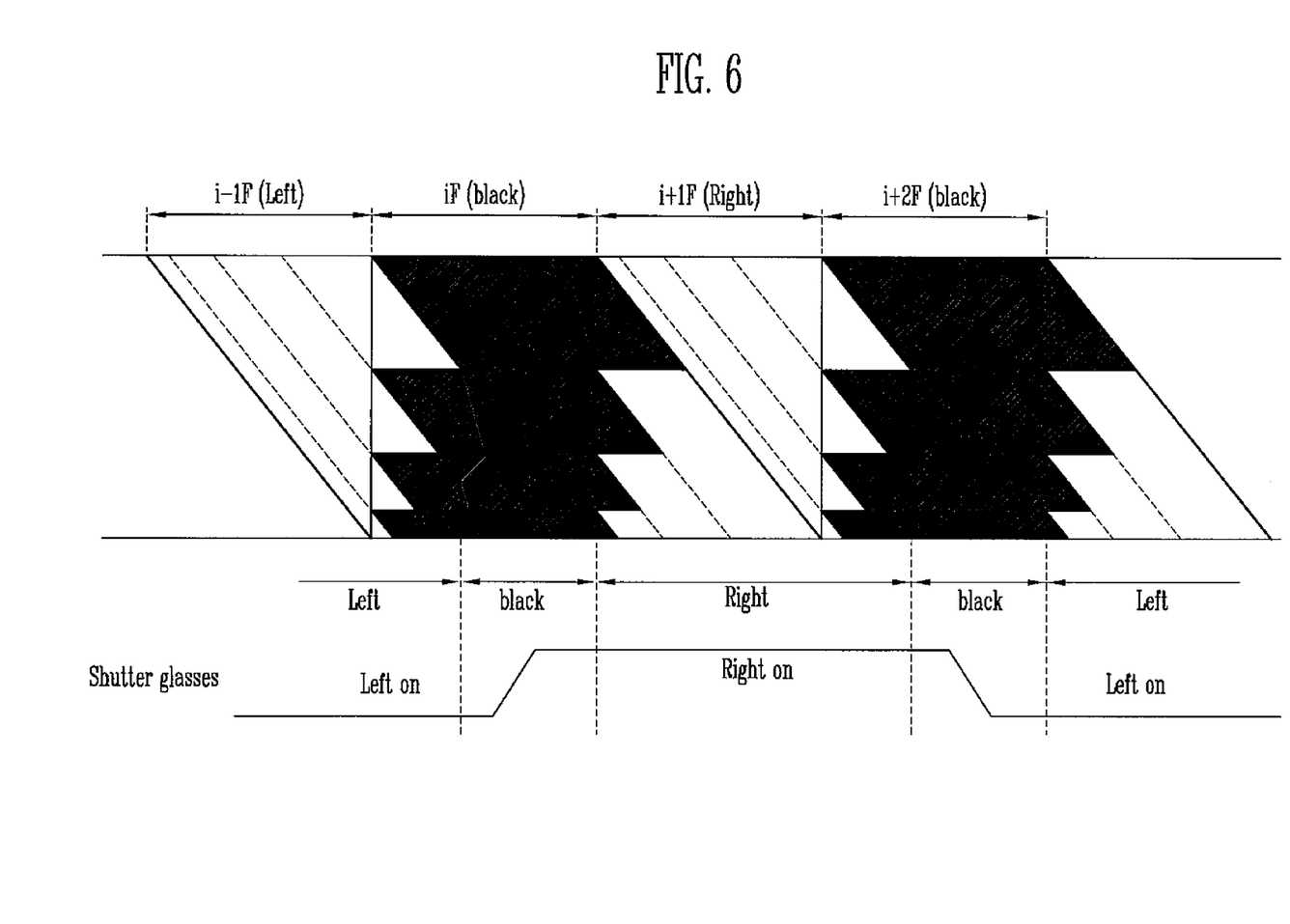
FIG. 6 is a diagram illustrating an example of a display period in the driving method of FIG. 4, according to an example embodiment of the present invention.

In one embodiment, for the purpose of 3D driving, as shown in FIG. 6, a left data signal is supplied during the (i−1)-th frame i−1F, a black data signal is supplied during the i-th frame iF, a right frame signal is supplied during the (i+1)-th frame i+1F, and a black data signal is supplied during the (i+2)-th frame i+2F.

In one embodiment, when a data signal of a next frame is supplied during a second period of a current frame, a period in which black is displayed is included in the entire screen, and thus a 3D image can be stably displayed by the period in which the black is displayed. For example, when the weight of the longest subfield, which is driven at 240 Hz (equivalent to drive time of about 4.3 ms) and included in one frame, is set to 50%, the black period is set to about 2.15 ms.

According to some embodiments of the present invention, the left and right sides of shutter glasses are switched during the period in which the black is displayed. During the period in which the black is not displayed, an image corresponding to a left data signal is supplied to the left side of the shutter glasses, or an image corresponding to a right data signal is supplied to the right side of the shutter glasses, thereby implementing a 3D image.

In some embodiments of the present invention, the black display period is generated by supplying the data signal of the next frame during the second period T2 of the current frame. A black period may not be inserted by controlling power. Thus, it is possible to reduce (e.g., to minimize) power consumption in the implementation of a 3D image. Further, when the data lines D1 to Dm are charged/discharged, unnecessary power may not be consumed during the period in which the black data signal is supplied in the data driver 120, thereby further reducing power consumption.

When a data signal of the next frame is supplied during the second period T2 of the current frame, the data driver 120 supplies a right or left data signal of the same frame during the corresponding period, thereby reducing (e.g., minimizing) the capacity of the storage unit 160.

For example, in the digital driving method shown in FIG. 3, the data driver 120 supplies (e.g., necessarily supplies) a data signal of the current frame and a data signal of the previous frame, corresponding to the scan signal. However, when supplying a data signal of the next frame during the second period 2T of the current frame for the purpose of 3D driving, the data driver 120 may supply only the data signal of the same frame, thereby reducing (e.g., minimizing) the capacity of the storage unit 160.

By way of summation and review, an organic light emitting display includes a plurality of pixels located (e.g., disposed) at crossing regions of data lines, scan lines, and power lines. Each pixel generally includes an organic light emitting diode, two or more transistors each configured to include a driving transistor, and one or more capacitors.

In order to implement a 3D image, the organic light emitting display displays left and right images, using four consecutive frames, and implements black during a switch time of shutter glasses by controlling the voltage of a cathode electrode. However, when the black is displayed by controlling the voltage of the cathode electrode, power consumption and cost are increased.

In the organic light emitting display and the driving method thereof, according to embodiments of the present invention, the black is displayed by controlling the data signal in the implementation of a 3D image, and accordingly, it is possible to reduce (e.g., minimize) power consumption and cost. Further, because the black data signal is supplied for each frame in the implementation of the 3D image, it is possible to reduce (e.g., minimize) power consumption, caused by the charging/discharging of the data lines.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various suitable changes in form and details may be made without departing from the spirit and scope of the present invention as set forth in the following claims and equivalents thereof.

What is claimed is:

1. A method of driving an organic light emitting display, the method comprising:
   supplying a left or right data signal of an i-th (i is a natural number) frame corresponding to a scan signal non-sequentially supplied during a first period in an i-th frame period;
   supplying a black data signal of an (i+1)-th frame corresponding to a scan signal non-sequentially supplied during a second period in the i-th frame period, the second period being different from the first period;
   supplying a black data signal of an (i+1)-th frame corresponding to a scan signal non-sequentially supplied during a third period in an (i+1)-th frame period; and
   supplying a right or left data signal of an (i+2)-th frame corresponding to a scan signal non-sequentially supplied during a fourth period in the (i+1)-th frame period, the fourth period being different from the third period,
   wherein the i-th and (i+1)-th frames are partially overlapped in time.

2. The method of claim 1, wherein data signals having weights corresponding to different emission times are supplied corresponding to consecutively supplied scan signals.

3. The method of claim 1, wherein the second period is a period after a primary data signal corresponding to the (i+1)-th frame is supplied.

4. The method of claim 3, wherein the primary data signal corresponding to the (i+1)-th frame is supplied in synchronization with a scan signal supplied to a first scan line.

5. An organic light emitting display wherein one frame includes a plurality of subfields, and has a unit time including j (j is a natural number of 2 or more) selection times, each of the selection times indicating when a scan signal is supplied, the organic light emitting display comprising:
   pixels positioned at areas defined by scan lines and data lines;
   a scan driver to non-sequentially supply a scan signal to the scan lines during the unit time; and
   a data driver to supply data signals having weights corresponding to different emission times during the unit time,
   wherein the data driver supplies a left or right data signal of an i-th (i is a natural number) frame during a first period in an i-th frame period, supplies a black data signal of an (i+1)-th frame during a second period in the i-th frame period, the second period being different from the first period, supplies a black data signal of an (i+1)-th frame during a third period in the (i+1)-th frame period, and supplies a right or left data signal of an (i+2)-th frame during a fourth period in the (i+1)-th frame period, the fourth period being different from the third period, and
   wherein the i-th and (i+1)-th frames are partially overlapped in time.

6. The organic light emitting display of claim 5, wherein the second period is a period after a primary data signal corresponding to the (i+1)-th frame is supplied.

7. The organic light emitting display of claim 6, wherein the data driver supplies the primary data signal corresponding to the (i+1)-th frame in synchronization with a scan signal supplied to a first scan line.

* * * * *